United States Patent
Bilik et al.

(10) Patent No.: US 10,656,248 B2
(45) Date of Patent: May 19, 2020

(54) RADAR POST PROCESSING FOR SIDELOBE SUPPRESSION

(71) Applicant: GM GLOBAL TECHNOLOGY OPERATIONS LLC, Detroit, MI (US)

(72) Inventors: Igal Bilik, Rehovot (IL); Alexander Pokrass, Bat Yam (IL); Moshe Laifenfeld, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 320 days.

(21) Appl. No.: 15/592,638

(22) Filed: May 11, 2017

(65) Prior Publication Data

US 2018/0329034 A1 Nov. 15, 2018

(51) Int. Cl.
*G01S 7/41* (2006.01)
*G01S 13/931* (2020.01)
*G01S 7/35* (2006.01)
*G01S 7/32* (2006.01)
*G01S 7/292* (2006.01)

(52) U.S. Cl.
CPC ............. *G01S 7/411* (2013.01); *G01S 7/2922* (2013.01); *G01S 7/32* (2013.01); *G01S 7/354* (2013.01); *G01S 7/414* (2013.01); *G01S 13/931* (2013.01); *G01S 2013/9318* (2020.01); *G01S 2013/9319* (2020.01); *G01S 2013/93271* (2020.01)

(58) Field of Classification Search
CPC ................................ G01S 7/411; G01S 7/2922
USPC ...................................................... 342/70–72
See application file for complete search history.

(56) References Cited

U.S. PATENT DOCUMENTS

| 5,530,447 A * | 6/1996 | Henderson | G01S 13/931 340/904 |
|---|---|---|---|
| 6,154,174 A * | 11/2000 | Snider | G01S 13/9023 342/371 |
| 2009/0073027 A1* | 3/2009 | McGuire | F41G 5/08 342/113 |
| 2013/0169470 A1* | 7/2013 | Emery | G01S 7/2927 342/91 |
| 2016/0084941 A1* | 3/2016 | Arage | G01S 13/931 342/91 |

(Continued)

OTHER PUBLICATIONS

V. Pravda and V. Bychkov, "Results of use a method of decrease sidelobes level of signals after compression for distinction of closely spaced targets," 2016 13th International Conference on Modern Problems of Radio Engineering, Telecommunications and Computer Science (TCSET), Lviv, 2016, pp. 243-245. (Year: 2016).*

*Primary Examiner* — Marcus E Windrich
(74) *Attorney, Agent, or Firm* — Cantor Colburn LLP

(57) ABSTRACT

A system, method and apparatus for detecting a plurality of targets in a radar device are disclosed. A transmitter transmits a source signal and a receiver receives echo signals from reflection of the source signal from the plurality of targets. A composite signal is generated that includes a plurality of target signals from the plurality of echo signals. A largest signal in the composite signal is identified and a value of a parameter of the largest signal is estimated. A representative signal is generated as a convolution of a point target having the estimated value of the parameter. The representative signal is subtracted from the composite signal to obtain a remaining signal. Another of the plurality of targets is determined using the remaining signal.

8 Claims, 2 Drawing Sheets

(56) References Cited

U.S. PATENT DOCUMENTS

2016/0084943 A1\* 3/2016 Arage .................. G01S 7/41
 342/102
2016/0341814 A1\* 11/2016 Nguyen ............ G01S 13/0209

\* cited by examiner

RADAR POST PROCESSING FOR SIDELOBE SUPPRESSION

FIELD OF THE INVENTION

The subject invention relates to a system and method for distinguishing target signals obtained using radar and, in particular, to a method and system for suppressing side lobes of target signals in order to distinguish multiple targets from one another.

BACKGROUND

Automobiles and other vehicles have come to employ safety systems which include radar technologies for detecting a location of an object or target with respect to the vehicle so that a driver or collision-avoidance device can react accordingly. A radar system includes a transmitter for sending out a source signal and a receiver for receiving an echo or reflection of the source signal from the target. The received signal is sampled at a selected sampling frequency and the sampled data points of the received signal are entered into a Fast Fourier Transform (FFT) in order to determine a frequency of the reflected signal. Various parameters and dimensions of the target, which are determined from the frequency, are then used to represent a target signal representative of the target in a data cube.

Due to the time-limited nature of digital sampling techniques, the target signal in the data cube is not a centralized point but instead displays a central peak with multiple side lobes. The presence of side lobes produces complications when attempting to distinguish multiple target signals from one another. For example, when a first target and a second target are in close proximity of each other, a side lobe of a first target signal (representative of the first target) can overlap a peak of a second target signal (representative of the second target). When the first target is much stronger or more intense that the second target, the side lobe of the first target signal can mask the presence of the second target signal or alter the appearance of the second target signal, thereby making accurate measurement of the second target signal difficult. Accordingly, it is desirable to remove the side lobes related to target signals in order to better distinguish multiple target signals from each other.

SUMMARY OF THE INVENTION

In one exemplary embodiment of the invention, a method is disclosed for detecting a first target from a second target in a radar device. In the method, a composite signal is obtained, the composite signal including a first target signal obtained by reflection of a source signal of the radar system from the first target and a second target signal obtained by reflection of the test signal from the second target. The first target signal is identified in the composite signal, and a representative signal for the first target signal is created as a convolution of a point target having a parameter value of the first target signal. The representative signal is subtracted from the composite signal to obtain a remaining signal and the second target is detected from the remaining signal.

In another exemplary embodiment of the invention, a method is disclosed for detecting a plurality of targets obtained by a radar system. A composite signal is obtained that includes a plurality of target signals that are obtained at a receiver of the radar system by reflections of a source signal of the radar system from the plurality of targets. An operation is performed on a processor that includes: identifying a largest signal in the composite signal, estimating a value of a parameter for the largest signal, generating a representative signal of the largest signal as a convolution of a point target having the estimated value of the parameter, and subtracting the representative signal from the composite signal to obtain a remaining signal.

In yet another exemplary embodiment of the invention, a radar system is disclosed. The radar system includes a transmitter for transmitting a source signal, a receiver for receiving echo signals from reflection of the source signal from a plurality of targets, and a processor. The processor is configured to generate a composite signal that includes a plurality of target signals from the plurality of echo signals, and perform an operation that includes: identifying a largest signal in the composite signal, estimating a value of a parameter of the largest signal, generating a representative signal as a convolution of a point target having the estimated value of the parameter, and subtracting the representative signal from the composite signal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
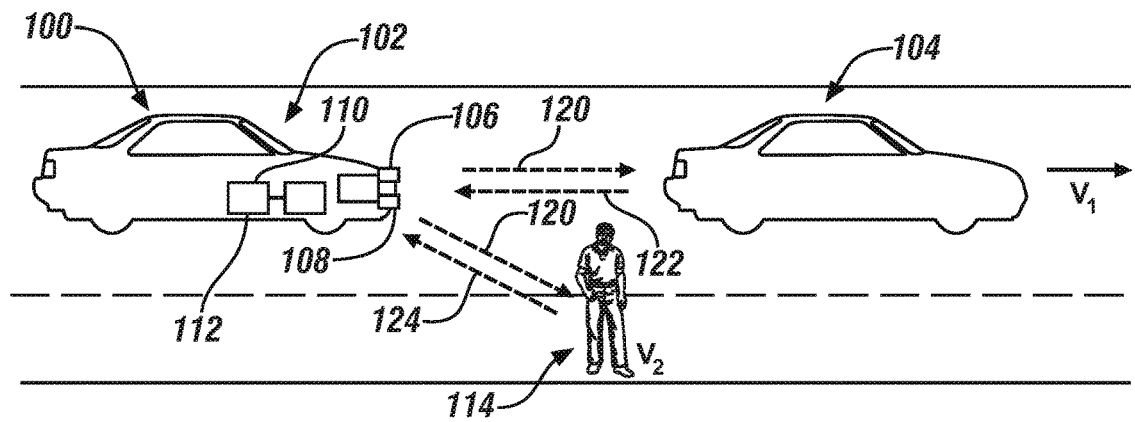
FIG. 1 shows a vehicle that includes a radar system suitable for determining a distance and/or a relative velocity of various objects or targets with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining a distance and/or a relative velocity of various objects or targets with respect to the vehicle 100. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 on-board the vehicle 100 controls and operates the transmitter 106 to generate a radio frequency wave (a "source signal" 120). In one embodiment, the source signal 120 includes a linear frequency-modulated continuous wave (LFM-CW), often referred to as a chirp signal. Alternately, the source signal 120 can be a pulsed signal or a combination of pulsed and chirp signals. A first target 104 and a second target 114 are shown in a possible pathway of the vehicle 100. For illustrative purposes, the first target 104 is another vehicle that is at a first location with respect to the vehicle 102 and has a first relative velocity $v_1$ with respect to vehicle 102. The second target 114 is a person who is at a second location (on a walk path) with respect to the vehicle 102 and has a second relative velocity $v_2$ with respect to vehicle 102. A reflection of the source signal 120 from first target 104 provides a first echo signal 122. A reflection of the source signal 120 from the second target 114 provides a second echo signal 124. The first echo signal 122 and second echo signal 124 are received at the receiver 108, which generally includes circuitry for sampling the echo signals 122, 124. The control unit 110 performs calculations on the first echo signal 122 and second echo signal 124 in order to determine distances and/or relative velocities of the first and second targets 104, 114 with respect to the vehicle 100. Knowledge of the distance and/or relative velocity of the first and second targets 104, 114 with respect to the vehicle 100 can then be used to maneuver the vehicle 100 by, for example, accelerating or decelerating the vehicle 100 or steering the vehicle in order to avoid the first and second targets 104, 114. In one embodiment, the control unit 110 determines distance and/or velocity of the first and second targets 104, 114 with respect to the vehicle 100 and cooperates with a collision-avoidance system 112 to control steering and acceleration/deceleration components to perform necessary maneuvers at the vehicle 100 to avoid the first and second targets 104, 114. In another embodiment, the control unit 110 provides a signal to alert a driver of the vehicle 100 so that the driver can take any necessary action to avoid the first and second targets 104, 114.

While the radar system 102 is discussed herein as being on-board vehicle 100, the radar system 102 may also be part of an immobile or stationary object in alternate embodiments. Similarly, the target 104 can be a vehicle or moving object or can be an immobile or stationary object.

Figure 2:
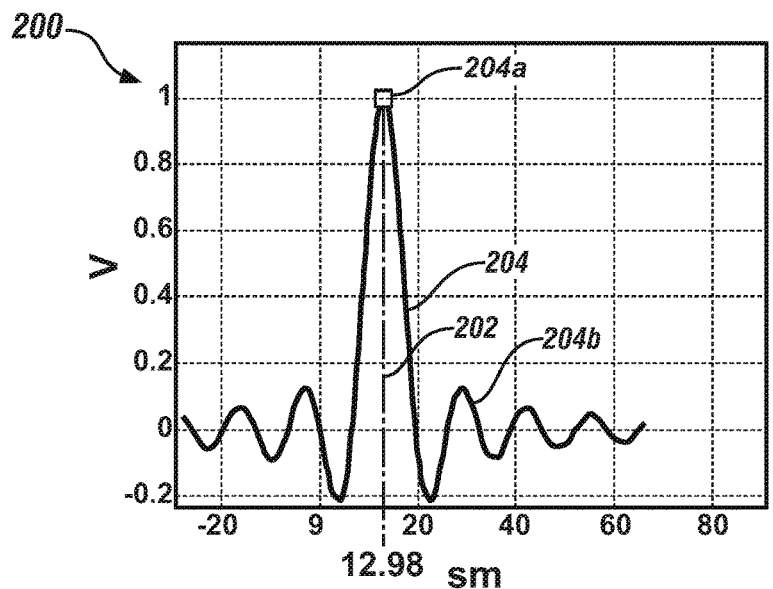
FIG. 2 shows an exemplary data space for a single target signal obtained via a radar system for a single target.

FIG. 2 shows an exemplary data space 200 for a single target signal obtained via a radar system for a single target. The target signal is shown for illustrative purposes as a signal in one dimension. This dimension can be one of range (distance to target), azimuth, and elevation of velocity (i.e., relative velocity) of the target. The radar system however is capable of obtaining values of parameters in multiple dimensions, including range, azimuth, elevation and velocity. When parameter values are obtained in all four dimensions, the radar system generates a four-dimensional data cube in which to represent the target signal. In the four-dimensional data cube, the target signal is therefore represented as a four-dimensional point. For illustrative purposes, FIG. 2 shows only a single dimension, that of range.

Data space 200 includes a time-delimited target signal 202, i.e., a target signal that is obtained over an infinite sampling time. The time-delimited target signal 202 is characterized by a single peak located at a location in parameter space. The illustrative target signal 202 is located at a distance of 12.98 m. The height of the peak is indicative of the strength or intensity of the signal from the target. FIG. 2 also shows a time-limited target signal 204. The time-limited target signal 204 is characterized by a peak 204a at the location of the target (i.e., at 12.98 m) as well as various side lobes 204b. The intensity of the side lobes 204b is generally about 10 decibels less than the intensity of the peak 204a. The shape of the time-limited target signal 204 is due to there being a finite time period for sampling.

Figure 3:
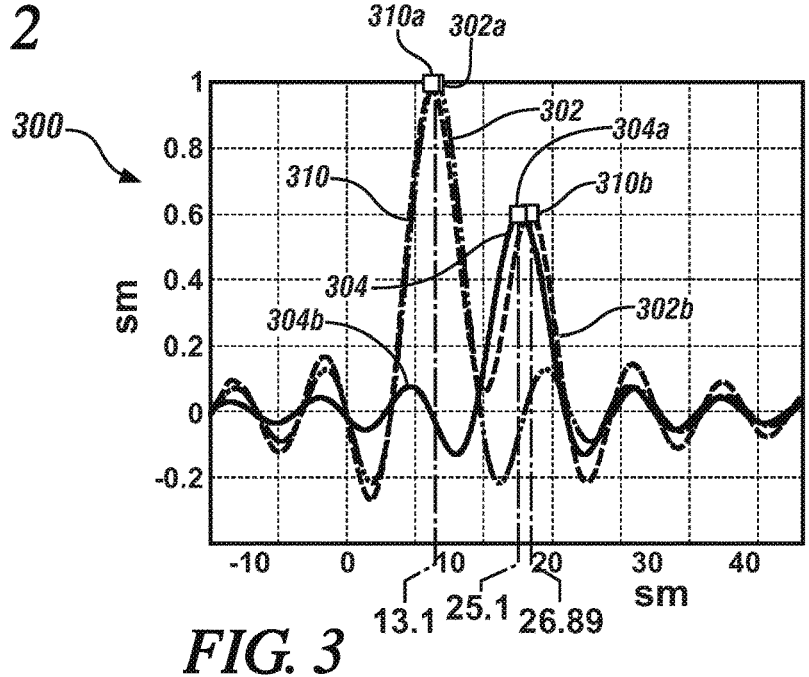
FIG. 3 shows an exemplary data space including multiple time-limited target signals obtained from multiple targets and well as a composite signal of the multiple target signals.

FIG. 3 shows an exemplary data space 300 including multiple time-limited target signals obtained from multiple targets. FIG. 3 shows a one-dimensional data space. However, as with FIG. 2, the radar system may present the target signals of FIG. 3 as four-dimensional signals in a four-dimensional data cube when four parameters of the target have been measured. A first target signal 302 is shown having a central peak 302a and side lobe 302b. A second target signal 304 is shown having a central peak 304a and side lobe 304b. For illustrative purposes, one can consider the first target signal 302 to be obtained with respect to the first target 104 of FIG. 1 and the second target signal 304 to be obtained with respect to the second target 114 of FIG. 1. The first target signal 302 is stronger or more intense than the second target signal 304.

FIG. 3 also shows a composite signal 310 that represents the sum of the first target signal 302 and the second target signal 304. The composite signal 310 exhibits two major peaks, 310a and 310b. Peak 310a includes peak 302a of the first target signal 302 as its major component. Therefore, the value of the parameter (e.g. range) of peak 310a is close enough to the parameter of peak 310 so as to be considered the same. For example, both peaks 310a and 302a are at about a range of about 13.1 meters (m). Peak 310b includes both peak 304a of the second target signal 304 and side lobe 302b of the first target signal as major contributors. Since the side lobe 302b is of comparable strength to the peak 304a, peak 310b is offset from peak 304a. For strong side lobe 302b, the value of the parameter for peak 310b is significantly different from the value of the parameter for peak 304a. As an example, peak 304a is located at 25.1 m and peak 310b is located at 26.89 m, for a difference of 1.79 meters. The method disclosed herein provides a method of determining the value of the parameter for peak 304b of the second signal 304, rather than the value for peak 310b. This method can be extended to four parameter dimensions as well as to the presence of multiple target signals within a four-dimensional data cube.

Figure 4:
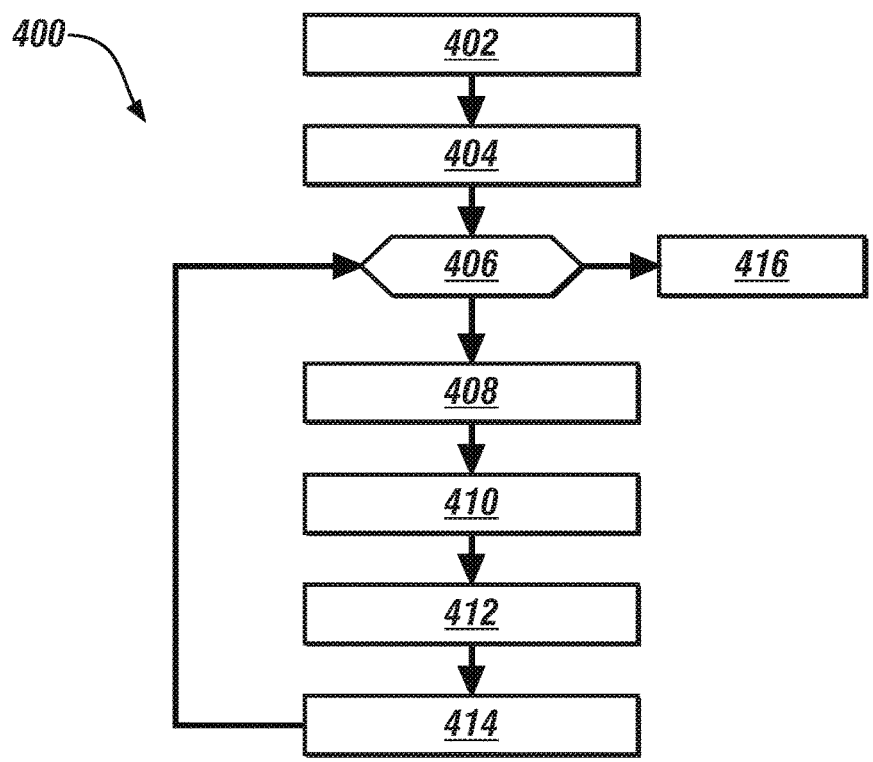
FIG. 4 shows a flowchart illustrating a method of detecting or distinguishing target signals in a composite signal.

FIG. 4 shows a flowchart 400 illustrating a method of detecting or distinguishing target signals in a composite signal and thereby to detect their associated targets. In box 402, a composite signal is obtained from a radar system by reflections of a source signal from a plurality of targets. A composite signal created from the reflections includes a plurality of target signals representing a plurality of targets. In Box 404, a largest, highest or most intense peak in the composite signal is determined. In Box 406, the largest peak is compared to a signal-to-noise ratio (SNR) and a decision is made. If a magnitude of the largest peak is greater than the SNR or greater than a selected threshold defined with respect to the SNR, the method proceeds to detect other target signals via Boxes 408-414. Otherwise, the method stops at Box 416.

In Box 408, a value of a parameter for the peak of the largest signal is estimated. The parameter is at least one of range, elevation, azimuth and velocity and is often all four of these parameters. In Box 410, a point target is created from the value of the parameter estimated in Box 408. For example, if the estimated parameter is a distance of 25 meters, a point target is created that is located at 25 meters. In Box 412, a representative signal is generated from the point target. The point target can be convolved with a function in order to obtain the representative signal. In one embodiment, the function is a sinc function, defined as $\text{sinc}(x) = \sin(x-x_0)/x$, where $x_0$ is the estimated value of the parameter and x is the parameter of integration. The convolution of the point target with the sinc function produces a representative signal similar to curve 304 of FIG. 2. In Box 414, the representative signal is subtracted out of the composite signal to obtain a remaining signal. This process can be iterated, using the remaining signal at Box 414 as the composite signal entered into the next iteration of Boxes 404 through 414.

While the method is described in flowchart 400 with respect to a single parameter (i.e., range) for illustrative purposes, it is to be understood that multiple parameters of a target can be measured by the radar system. In on embodiment, the parameters of range, azimuth, elevation and velocity are determined by the radar system and used in flowchart 400. The resulting composite signal and the target signals that make up the composite signal are four-dimensional signals in a four dimensional data cube, wherein the dimensions of the data cube are the parameters of range, azimuth, elevation and velocity. Thus, the value of the parameter for the largest signal (i.e., the largest peak of the largest signal) estimated in Box 408 includes values of four parameters. The point target created in Box 410 is a four-dimensional point target, and in Box 412 the four-dimensional point target is convolved with a four-dimensional sinc function in order to obtain a four-dimensional representative signal. In Box 414, the four-dimensional representative signal is subtracted from the four-dimensional composite signal in order to obtain a four-dimensional remaining signal.

Figure 5:
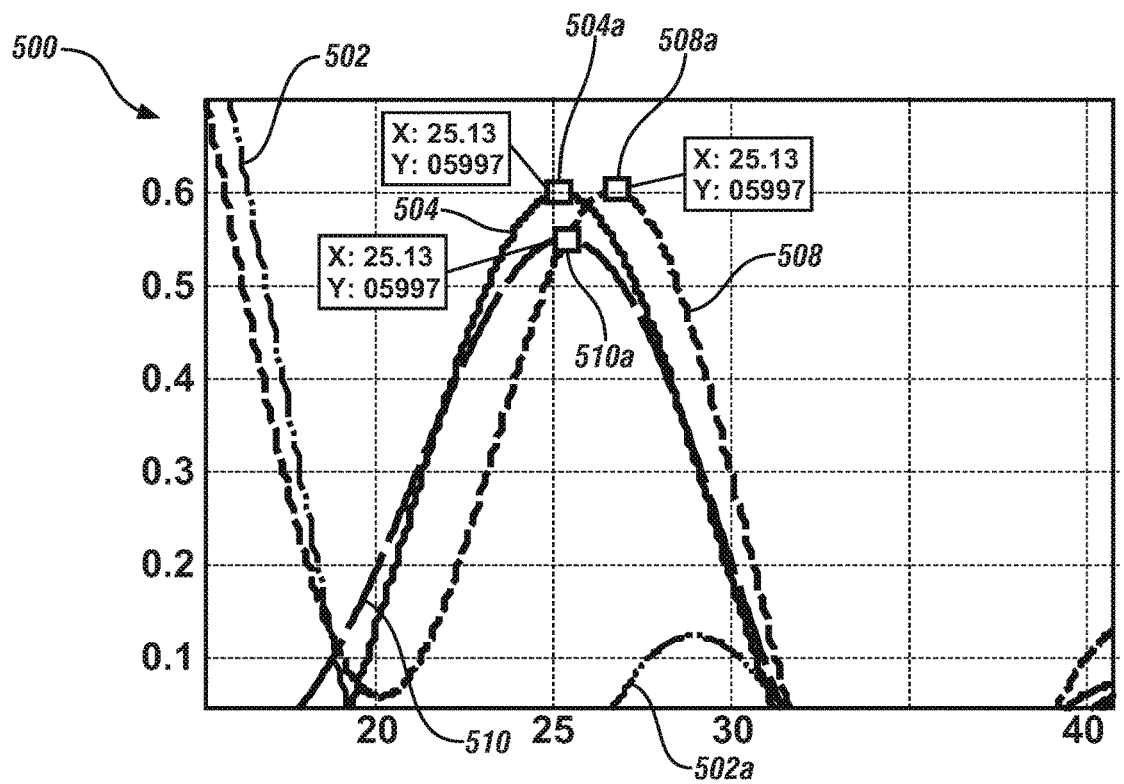
FIG. 5 shows a data space illustrating the results of applying the method disclosed herein on determining target signals from the composite signal.

FIG. 5 shows a data space 500 illustrating the results of applying the method disclosed herein on determining target signals from the composite signal. The data space 500 shows only a single dimension, which is selected as range for illustrative purposes only. The composite signal includes a first target signal and a second target signal. The data space 500 shows a close-up in a region of a peak 504 of the second target signal. The data space 500 shows a portion of a peak 502 of a first target signal and a first side lobe 502s of the first target signal. The data space also shows a peak 504 of the second target signal. The strength or intensity of the first target signal at its peak is greater than the strength or intensity of the second target signal at its peak. Composite signal 508 is a summation of the first target signal and the second target signal. Due to the strength of the side lobe 502s, an estimated value of the range determined by the apex 508a of the composite signal 508 is significantly different that the estimated value of the range determined by the apex 504a of the peak 504. In particular, apex 508a is located at 26.76, while apex 504a is located at 25.15 for an error of about 6.4%

Curve 510 represents a remaining signal that results from applying the method disclosed herein or identifying the first (strongest) signal, creating a representative signal for the first signal and subtracting the representative signal from the composite signal. It is clear that the apex 510a of remaining signal 510 is more aligned with the apex 504a than is the apex 508a of the composite signal 508. In particular, apex 510a is located at 25.39 m while apex 504a is located at 25.13 m, for an error of about 0.95%. Therefore, the accuracy with which one is able to determine the apex of the second target signal, as well as its parameter value(s), is increased by subtracting out the first target signal and its side lobes from the composite signal.

The methods disclosed herein improve the ability of a radar system to distinguish multiple target signals from each other and to more accurately determine the values of parameters associated with the multiple target signals. The improved parameter values can be provided to the driver or collision avoidance system in order for the driver or collision avoidance system to have improved reaction in avoiding targets, thus increasing a safety of the driver and vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of detecting a second target from a first target in a radar system, comprising:
   obtaining a composite signal including a first target signal and a second target signal, the first target signal obtained by reflection of a source signal of the radar system from the first target and the second target signal obtained by reflection of the source signal from the second target;
   identifying, at a processor, the first target signal in the composite signal;
   generating, at the processor, a representative signal for the first target signal via a convolution of a point target having a parameter value of the first target signal;
   subtracting, at the processor, the representative signal from the composite signal to obtain a remaining signal; and
   detecting, at the processor, the second target from the remaining signal.

2. The method of claim 1, wherein the first target signal is stronger than the second target signal.

3. The method of claim 2, wherein subtracting the representative signal from the composite signal removes a side lobe from the composite signal to reveal the second target signal when a peak of the second target signal coincides with the side lobe.

4. The method of claim 1 further comprising determining the parameter value of the first target signal and creating the point target with the parameter value.

5. The method of claim 1, wherein the parameter value of the first target signal is indicated by an apex of a central peak of the first target signal.

6. The method of claim 1, wherein generating the representative signal for the first target signal via the convolution of the point target further comprises convolving the point target with a sinc function.

7. The method of claim 1, wherein the parameter is at least one of: (i) range; (ii) azimuth; (iii) elevation; and (iv) relative velocity.

8. The method of claim 1, wherein the first target and second target are determined with respect to a vehicle that employs the radar system to allow the vehicle to maneuver with respect to the first target and the second target.

* * * * *